(12) United States Patent
Kim et al.

(10) Patent No.: US 10,108,312 B2
(45) Date of Patent: Oct. 23, 2018

(54) APPARATUS AND METHOD FOR PROCESSING INFORMATION LIST IN TERMINAL DEVICE

(71) Applicant: Samsung Electronics Co., Ltd., Suwon-si, Gyeonggi-do (KR)

(72) Inventors: Moonsoo Kim, Seoul (KR); Dasom Lee, Seoul (KR); Kwangtai Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 53 days.

(21) Appl. No.: 14/514,860

(22) Filed: Oct. 15, 2014

(65) Prior Publication Data
US 2015/0113395 A1    Apr. 23, 2015

(30) Foreign Application Priority Data
Oct. 17, 2013    (KR) .................. 10-2013-0123702

(51) Int. Cl.
*G06F 3/0482* (2013.01)
*G06F 17/22* (2006.01)
*G06F 3/0481* (2013.01)
*G06F 17/21* (2006.01)

(52) U.S. Cl.
CPC ........ *G06F 3/0482* (2013.01); *G06F 3/04817* (2013.01); *G06F 17/212* (2013.01); *G06F 17/2235* (2013.01)

(58) Field of Classification Search
CPC ............. G06F 17/30014; G06F 17/212; G06F 3/04817
See application file for complete search history.

(56) References Cited

U.S. PATENT DOCUMENTS

| 5,539,427 | A | * | 7/1996 | Bricklin | ............ G06F 17/30259 345/173 |
| 5,832,100 | A | * | 11/1998 | Lawton | .................. G06F 17/243 382/100 |
| 6,565,611 | B1 | * | 5/2003 | Wilcox | .................. G06F 17/242 382/224 |

(Continued)

FOREIGN PATENT DOCUMENTS

| KR | 10-2012-0034542 A | 4/2012 |
| KR | 10-2012-0039998 A | 4/2012 |

(Continued)

OTHER PUBLICATIONS

View of blogs.technet.microsoft.com, "Make your documents easier to spot with thumbnails", published Apr. 12, 2010 (hereinafter: Suzanne100).*

(Continued)

*Primary Examiner* — Scott Baderman
*Assistant Examiner* — Mario M Velez-Lopez
(74) *Attorney, Agent, or Firm* — Jefferson IP Law, LLP

(57) ABSTRACT

A method of processing a document by an electronic device is provided. The method includes displaying, by a display unit, a document, detecting selected areas in the displayed document, extracting information from the detected selected areas, generating the extracted information as lists, and storing the lists together with link information of documents where the lists are located, wherein the lists are stored as one document list.

19 Claims, 18 Drawing Sheets

(56) References Cited

U.S. PATENT DOCUMENTS

| | | | |
|---|---|---|---|
| 6,769,096 B1* | 7/2004 | Kuppusamy | G06F 17/30014 |
| | | | 707/999.01 |
| 8,234,249 B2* | 7/2012 | Prahlad | G06F 17/30442 |
| | | | 707/640 |
| 8,335,986 B2 | 12/2012 | Carlen et al. | |
| 8,462,394 B2* | 6/2013 | Fan | H04N 1/40062 |
| | | | 235/382 |
| 8,826,131 B2* | 9/2014 | Suito | G11B 19/025 |
| | | | 386/291 |
| 2002/0140571 A1 | 10/2002 | Hayes et al. | |
| 2004/0139400 A1* | 7/2004 | Allam | G06F 17/212 |
| | | | 715/201 |
| 2007/0276795 A1* | 11/2007 | Poulsen | G06Q 90/00 |
| 2008/0086703 A1 | 4/2008 | Flynt et al. | |
| 2008/0214215 A1* | 9/2008 | Aaltonen | 455/466 |
| 2009/0276722 A1* | 11/2009 | Segel | G06F 17/30029 |
| | | | 715/765 |
| 2009/0300541 A1* | 12/2009 | Nelson | G06F 3/0481 |
| | | | 715/799 |
| 2010/0235793 A1* | 9/2010 | Ording | G06F 1/1626 |
| | | | 715/863 |
| 2011/0093470 A1* | 4/2011 | Gokhale | G06F 17/30622 |
| | | | 707/741 |
| 2011/0123114 A1* | 5/2011 | Hwang | G06K 9/00463 |
| | | | 382/176 |
| 2012/0084705 A1 | 4/2012 | Lee et al. | |
| 2012/0096403 A1 | 4/2012 | Jung et al. | |
| 2012/0310642 A1 | 12/2012 | Cao et al. | |
| 2014/0108898 A1* | 4/2014 | Kang | G06F 17/24 |
| | | | 715/202 |
| 2016/0063016 A1* | 3/2016 | Eggleston | G06F 17/30864 |
| | | | 707/706 |

FOREIGN PATENT DOCUMENTS

| | | |
|---|---|---|
| KR | 10-2012-0135137 A | 12/2012 |
| KR | 10-2013-0016625 A | 2/2013 |

OTHER PUBLICATIONS techrepublic.com, "How to create one table of contents from multiple documents", published Aug. 17, 2011 (hereinafter: Harkins).*

* cited by examiner

FIG. 2A

Memo

1. Ristretto
Ristretto is the typical Italian espresso. It is a short, strong, full-bodied espresso with a touch of acidity. It has a pleasantly lingering taste.
Origin: Ristretto is a subtle combination of the best "Milds" of East Africa and the Americas (Columbia and Central America). It has a delicate hint of acidity and a delicious after-taste. A touch of Brazilian Arabica and African Robusta gives it a little extra strength.

2. Arpeggio
Arpeggio is a Mediterranean blend par excellence with a strong character, intense body and long, exquisite after-taste. Its thick, smooth crema remains to the last sip.
Origin: this blend is made up of "Milds" from Central America. A touch of Brazilian Arabica increases its body and sustains the colour and consistency of the crema. This subtle alchemy gives it a fantastic aroma.

3. Roma
With its sweetness and its woody notes, Roma is the ideal coffee for a short espresso which is not too strong.
Origin: a perfect balance of finesse, strength and fullness, Roma is blended from Central American coffees cultivated at high altitudes for intensity. To these coffees are added similar proportions of Brazilian and African coffee that provide body and roundness in the mouth.

4. Livanto
A very well balanced blend, Livanto is characterized by a dense and velvety aroma. It is a uniquely rounded

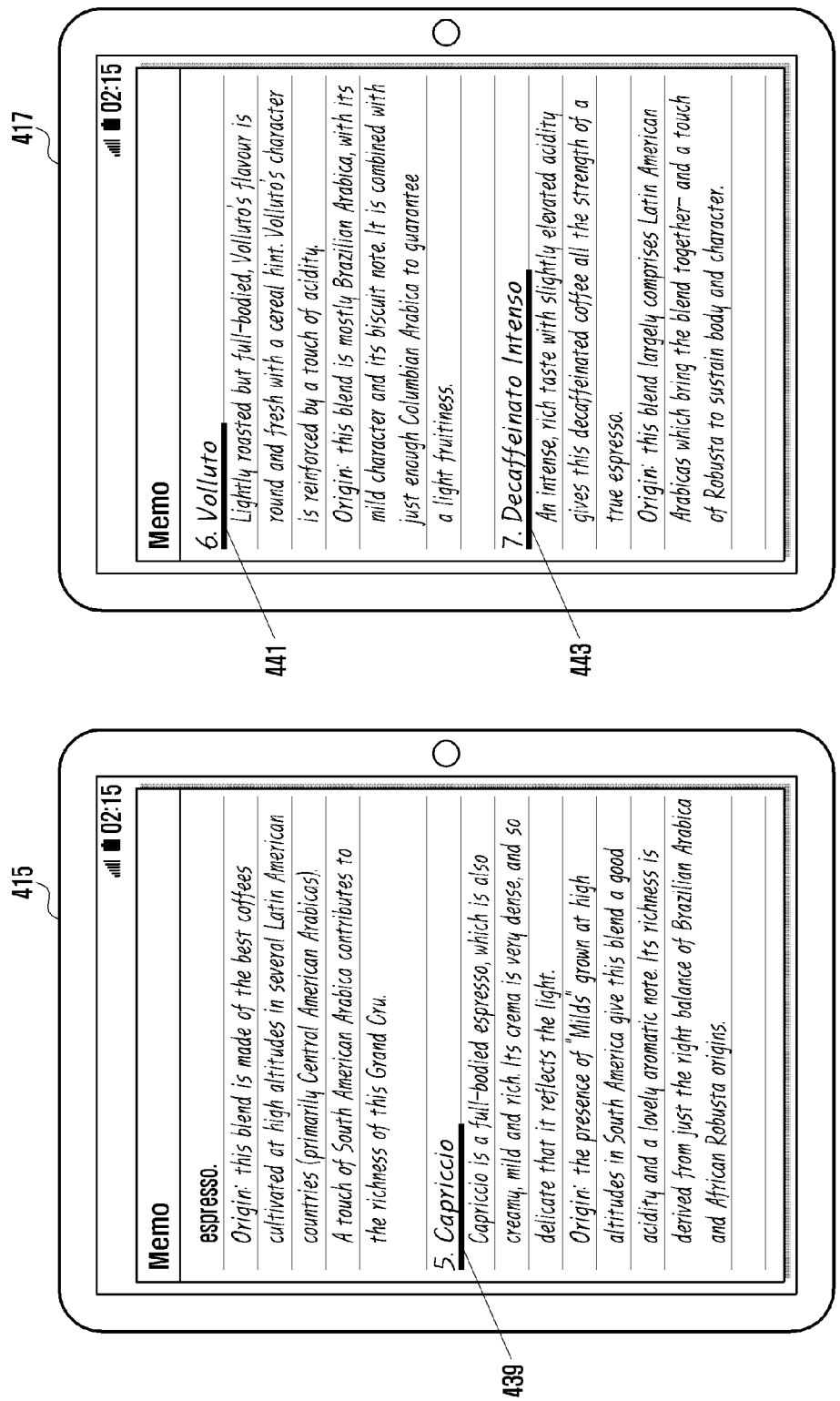

APPARATUS AND METHOD FOR PROCESSING INFORMATION LIST IN TERMINAL DEVICE

CROSS-REFERENCE TO RELATED APPLICATION(S)

This application claims the benefit under 35 U.S.C. § 119(a) of a Korean patent application filed on Oct. 17, 2013, in the Korean Intellectual Property Office and assigned Serial number 10-2013-0123702, the entire disclosure of which is hereby incorporated by reference.

TECHNICAL FIELD

The present disclosure relates to an apparatus and a method for generating and processing a list of information in a terminal device.

BACKGROUND

In general, electronic devices may have a document making function and also obtain various documents through the Internet. The document making function may be performed through a keypad, and also performed in the form of cursive script through an electronic pen. Further, the made document or obtained document may be stored with a name for the document made by a user or stored in a preset form.

The electronic devices may display a stored document in a preview form according to a request from the user. For example, a method of previewing content of the document in an electronic device in which writing is possible uses a method of previewing a preset image or displaying a first page of the corresponding writing content as a preview image.

The above information is presented as background information only to assist with an understanding of the present disclosure. No determination has been made, and no assertion is made, as to whether any of the above might be applicable as prior art with regard to the present disclosure.

SUMMARY

In general, when a number of pages of a document (information) stored in an electronic device is large, it is difficult to identify content of the corresponding document (information). For example, when a user makes a document with several pages in an electronic device in which a cursive script document can be made, the user has difficulty in recognizing what content is in the cursive script document when the user desires to identify the document. In this case, when a preview using a preconfigured image is shown, the user cannot recognize the content since the preview image only shows a title. When the preview image shows only a first page, the user also has difficulty in recognizing the content if various types of cursive scripts are contained in one writing content.

Aspects of the present disclosure are to address at least the above-mentioned problems and/or disadvantages and to provide at least the advantages described below. Accordingly, an aspect of the present disclosure is to provide an apparatus and method for generating and processing a list of information in a terminal device.

According to various embodiments of the present disclosure, when a document (information) including a plurality of pages is made or obtained through the Internet, a user may extract and list only selected parts and store the selected parts as lists, and also display a document (information) of a list selected from the lists when identifying the document.

In accordance with an aspect of the present disclosure, a method of processing a document by an electronic device is provided. The method includes displaying, by a display unit, a document, detecting selected areas in the displayed document, extracting information from the detected selected areas, generating the extracted information as lists, and storing the lists together with link information of documents where the lists are located, wherein the lists are stored as one document list.

In accordance with another aspect of the present disclosure, an apparatus for processing a document in an electronic device is provided. The apparatus includes a display unit configured to display a document, an input unit configured to generate an area selection signal from the displayed document, the area selection signal identifying detected selected areas in the displayed document, a storage unit configured to store a document list and link information, and a controller configured to extract information from the detected selected areas identified by the area selection signal, to generate the extracted information as lists, and to store the lists in the storage unit together with link information of documents where the lists are located, wherein the lists are stored in one document list.

When a document includes several pages in an electronic device, a user can select areas of information on a desired page, generate lists, and store the lists. When the user selects a desired list from the lists to display the document, the user can immediately identify a desired position of the document. Accordingly, when displaying the document in the electronic device, the user can extract and display a part which the user desires. Further, in the case of an electronic device into which writing input can be made, utilization of the electronic device can improve since the user can generate a list suitable for the user to display the document.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 2A, 2B, 2C, and 2D illustrate examples of processing a made document or a downloaded document according to various embodiments of the present disclosure;

FIGS. 4A, 4B, 4C, and 4D are views describing a method of generating a document list in an electronic device according to various embodiments of the present disclosure;

Throughout the drawings, it should be noted that like reference numbers are used to depict the same or similar elements, features, and structures.

DETAILED DESCRIPTION

Figure 1:
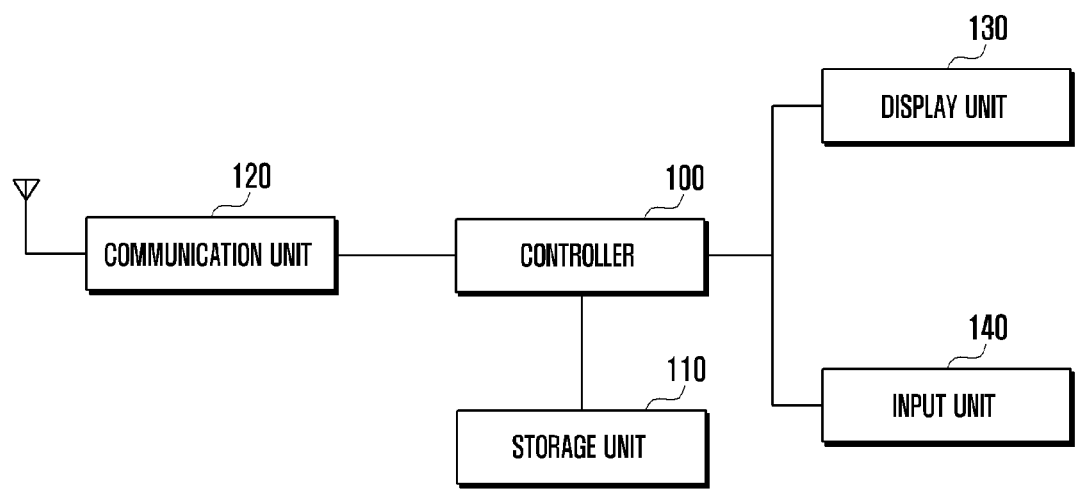
FIG. 1 is a block diagram illustrating a configuration of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A user may extract only a part which the user desires from a document (information) and make the extracted part as a preview when making or obtaining the document (information). That is, in an electronic device which can make a document (information) using a writing input through a pen and/or a text input through a keypad and/or obtain a document (information) through the Internet, lists can be configured by extracting a particular part of the document (information) selected by the user. The configured lists may be made in thumbnail images and displayed by icons.

In the following description, a document (information) made by a writing input using a pen and a text input using a keypad or a document (information) which can be downloaded through the Internet is referred to as a document (information). The document may include a character, a writing input, a drawing, and/or a picture.

In a state where a document is displayed, when the user selects a particular area of the displayed document, the electronic device extracts content corresponding to the selected particular area, generates the extracted content as one list, stores the generated list together with link information of the document as a list, and stores the stored lists in a configured area as a list when the list generation ends. The configured area may be a memo area. When the document is made by cursive script, the document may be stored in a cursive script memo (in S-memo in a case of a Samsung Galaxy mobile phone).

At this time, the electronic device may recognize a writing input made by a pen or a user's finger when the document is made. Further, a particular area of the document may be selected by the user using an underline, a drag, or a check. An operation of extracting the content corresponding to the particular area may include an operation of extracting the content by capturing a partial image or recognizing text. An operation of storing the lists may combine the lists into one image, and the image may be a preview image such as a small thumbnail. When a list is selected from the lists, the electronic device may display a document corresponding to the selected list.

FIGS. 1 through 8, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 is a block diagram illustrating a configuration of an electronic device according to an embodiment of the present disclosure. The electronic device may be various digital devices such as a mobile phone including a smart phone, an MP3 terminal, a tablet computer, a laptop computer and the like. FIGS. 2A to 2D illustrate examples of processing a made document or a downloaded document according to various embodiments of the present disclosure.

Referring to FIG. 1, a controller 100 is illustrated, where the controller 100 controls general operations of the electronic device. A storage unit 110 may include a program memory for storing an operation program of the electronic device and a program according to an embodiment of the present disclosure and a data memory for storing processed information.

Further, referring to FIG. 1 a communication unit 120 performs a wireless communication function with a base station or an Internet server. The communication unit 120 may include a transmitter for up-converting a frequency of a transmitted signal and amplifying power and a receiver for low noise-amplifying a received signal and down-converting a frequency. Further, the communication unit 120 may include a modulator and a demodulator. The modulator modulates a transmitted signal and transmits the modulated signal to the transmitter and the demodulator demodulates a signal received through the receiver. In this case, the modulator/demodulator may be Long-Term Evolution (LTE), Wideband Code Division Multiple Access (WCDMA), Global System for Mobile (GSM) or the like, Wireless Fidelity (WIFI), Worldwide Interoperability for Microwave Access (WIMAX) or the like, or Near-Field Communication (NFC), Bluetooth or the like. In an embodiment of the present disclosure, it is assumed that the communication unit 120 includes communication units such as LTE, WIFI, Bluetooth, NFC and the like.

Referring to FIG. 1, a display unit 130 displays an image photographed under a control of the controller 100. The display unit 130 may be a Liquid Crystal Display (LCD) or an Organic Light Emitting Diode (OLED). An input unit 140 generates inputs of the electronic device. The input unit 140 may include a finger touch detection panel which can detect a direct touch and a proximity touch of a finger and a pen touch detection panel which can detect a direct touch and a proximity touch of a pen (for example, hovering). The finger touch detection panel may be a touch panel in a capacitive type and the pen touch detection panel may be a touch panel in a capacitive type or an ElectroMagnetic Resonance (EMR) sensor pad. The input unit 140 may detect a position of a direct or proximity touch input (coordinate information) and output the touch input to the controller 100. Particularly, when the input unit 140 detects a direct touch or a proximity touch by a finger or a pen in a particular area in a state where a document is displayed, the input unit 140 outputs an area selection signal for generating the touch as a list to the controller 100. The display unit 130 and the input unit 140 may be configured as an integral touch screen.

The controller 100 may make a document according to a character or writing input made through the input unit 140 and also download a document through the communication unit 120. At this time, the controller 100 may display the made document or the downloaded document on the display unit 130 as illustrated in FIGS. 2A and 2B.

Figure 2B:
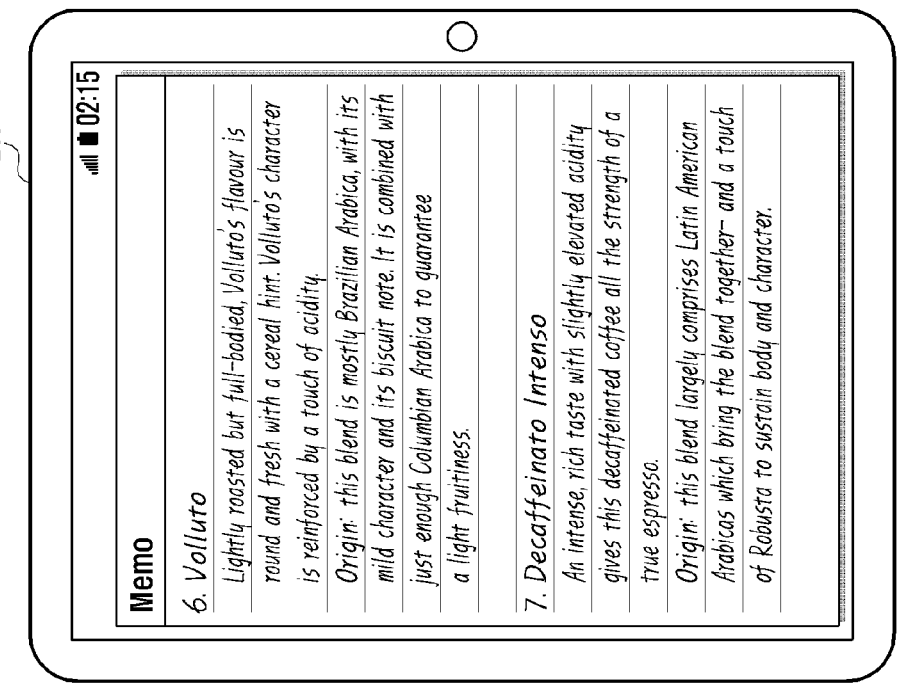
Figure 2B:
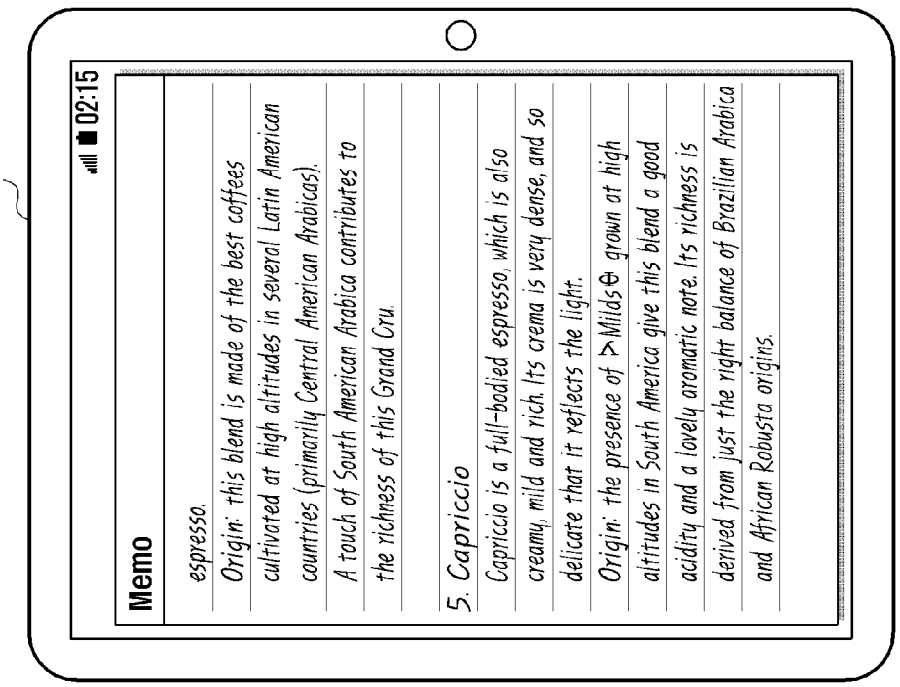
Figure 2C:
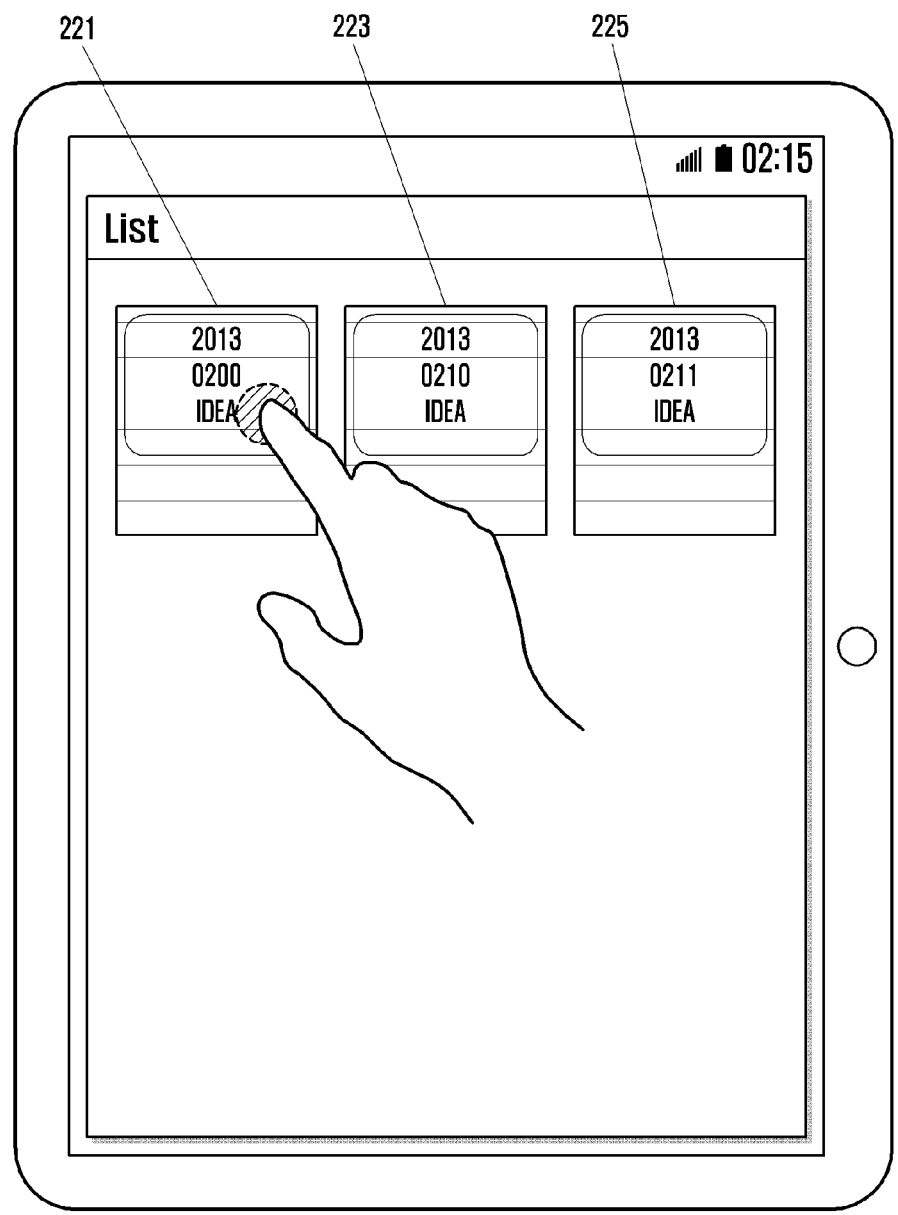
Figure 2D:
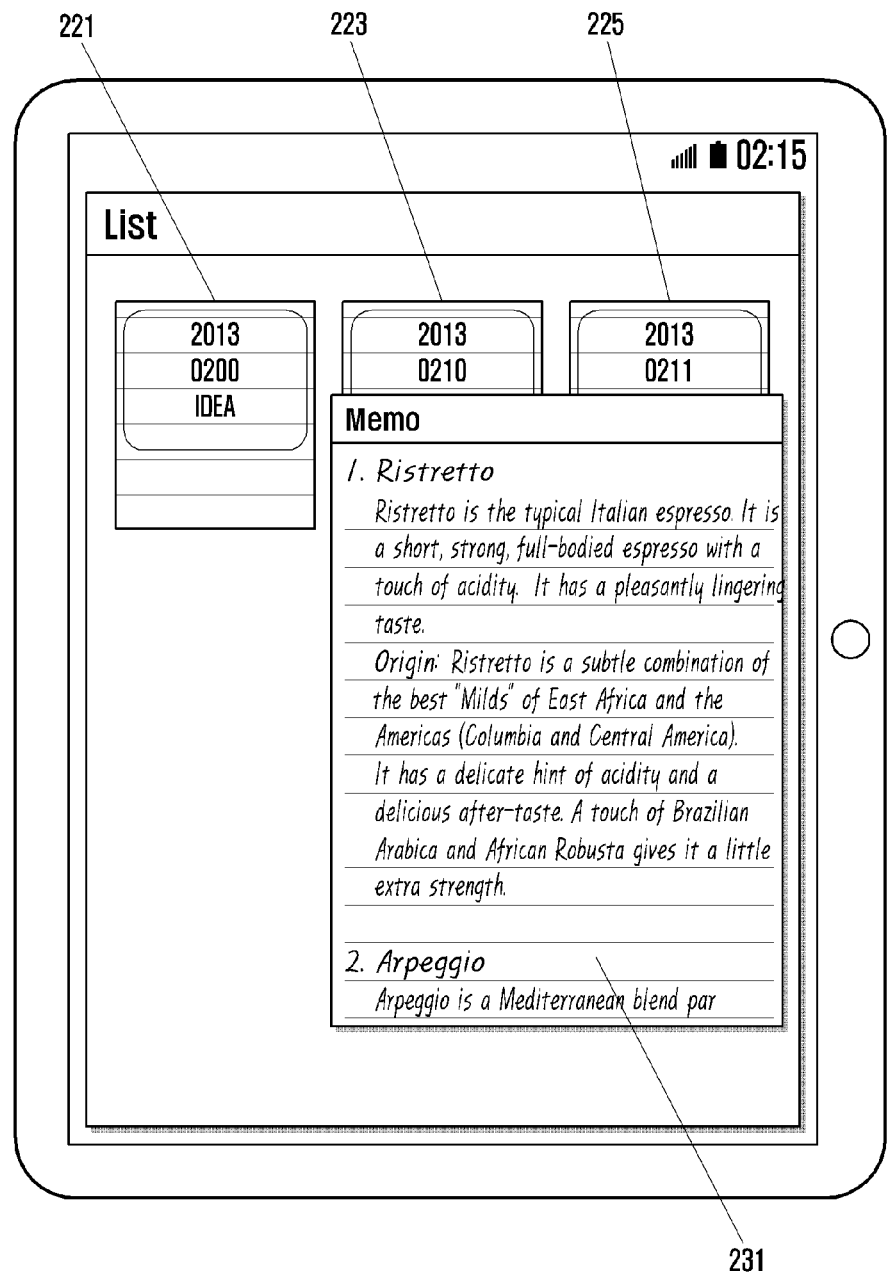

Referring to FIGS. 2A and 2B, an example is illustrated in which a made or downloaded document includes four or more pages 211, 213, 215 and 217. The document illustrated in FIGS. 2A and 2B may be stored in the storage unit 110. The controller 100 may display the document stored in the storage unit 110 by a user's selection. When the user selects a document folder, the controller 100 may display lists of stored documents 221, 223 and 225 of FIG. 2C. When the user selects a particular document list from the displayed document lists (when the user selects a document 221), the controller 100 may display a document 231 as illustrated in FIG. 2D.

At this time, the document displayed on the display unit 130 as illustrated in FIGS. 2A and 2B may be a document displayed in a state where the document is made, the document is downloaded, or the stored document is selected. Further, in a state where the document is displayed as illustrated in FIGS. 2A and 2B, document lists may be generated. Accordingly, when the user selects a particular area of the document displayed through the input unit 140 in a state where the document is displayed on the display unit 130 as illustrated in FIGS. 2A and 2B, the controller 100 extracts content corresponding to the selected area of the document, generates the extracted content as one list, and stores the generated list together with link information of the document in the storage unit 110 as a list. The list stored in the storage unit 110 may include a plurality of lists, and each of the lists may be stored together with position information (that is, link information) of the document where the corresponding list is located in the document. Further, after generating the list as a thumbnail image, the controller 110 may store the generated thumbnail image in a particular area (for example, a memo area or an S-memo area) of the storage unit 110 in the form of icon.

Figure 3:
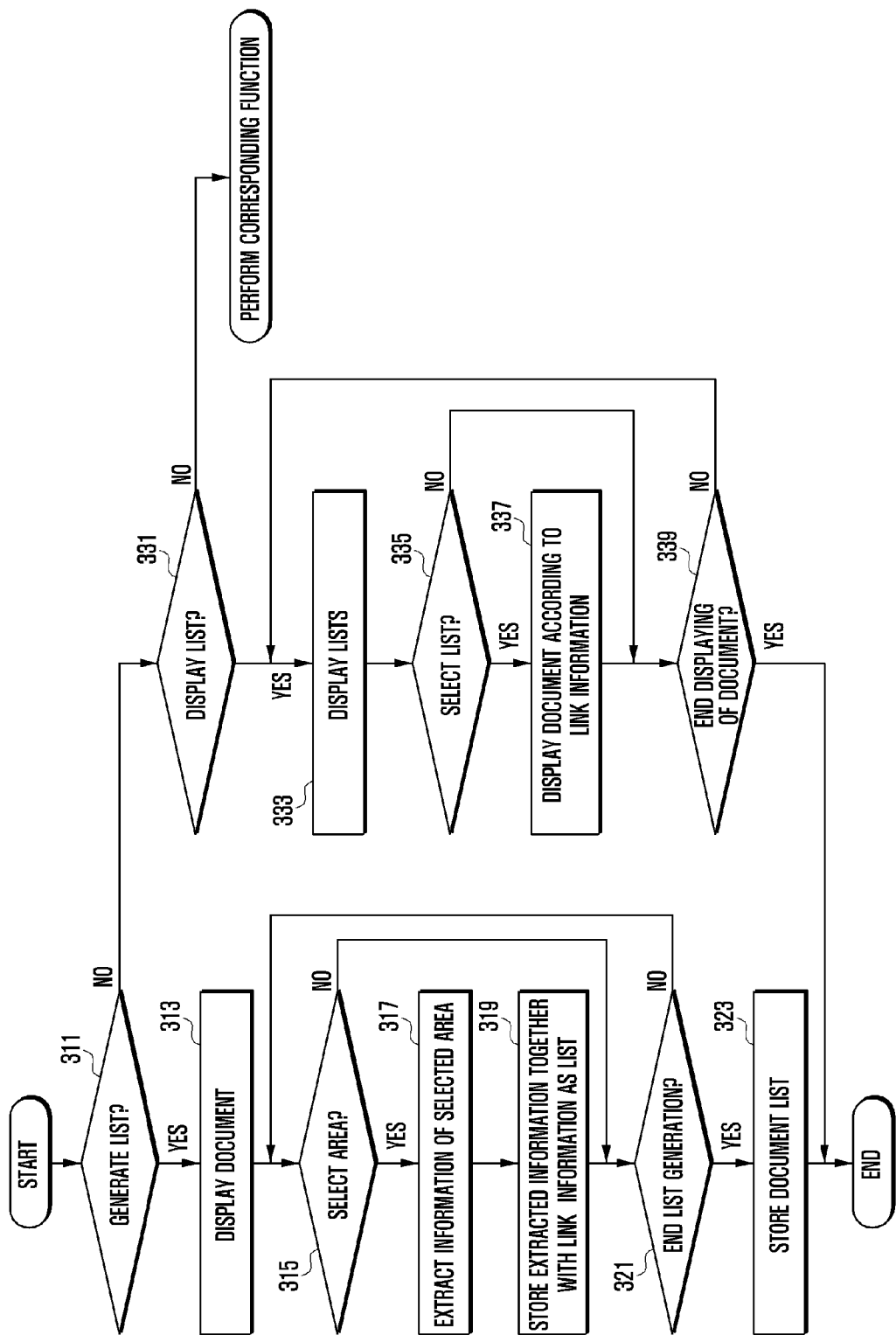
FIG. 3 is a flowchart illustrating a process of generating and selecting a document list displayed on an electronic device to display the document according to an embodiment of the present disclosure.

FIG. 3 is a flowchart illustrating a process of generating and selecting a document list displayed on the electronic device to display the document according to an embodiment of the present disclosure. FIGS. 4A, 4B, 4C, and 4D are views describing a method of generating a document list in the electronic device according to various embodiments of the present disclosure.

Figure 4A:
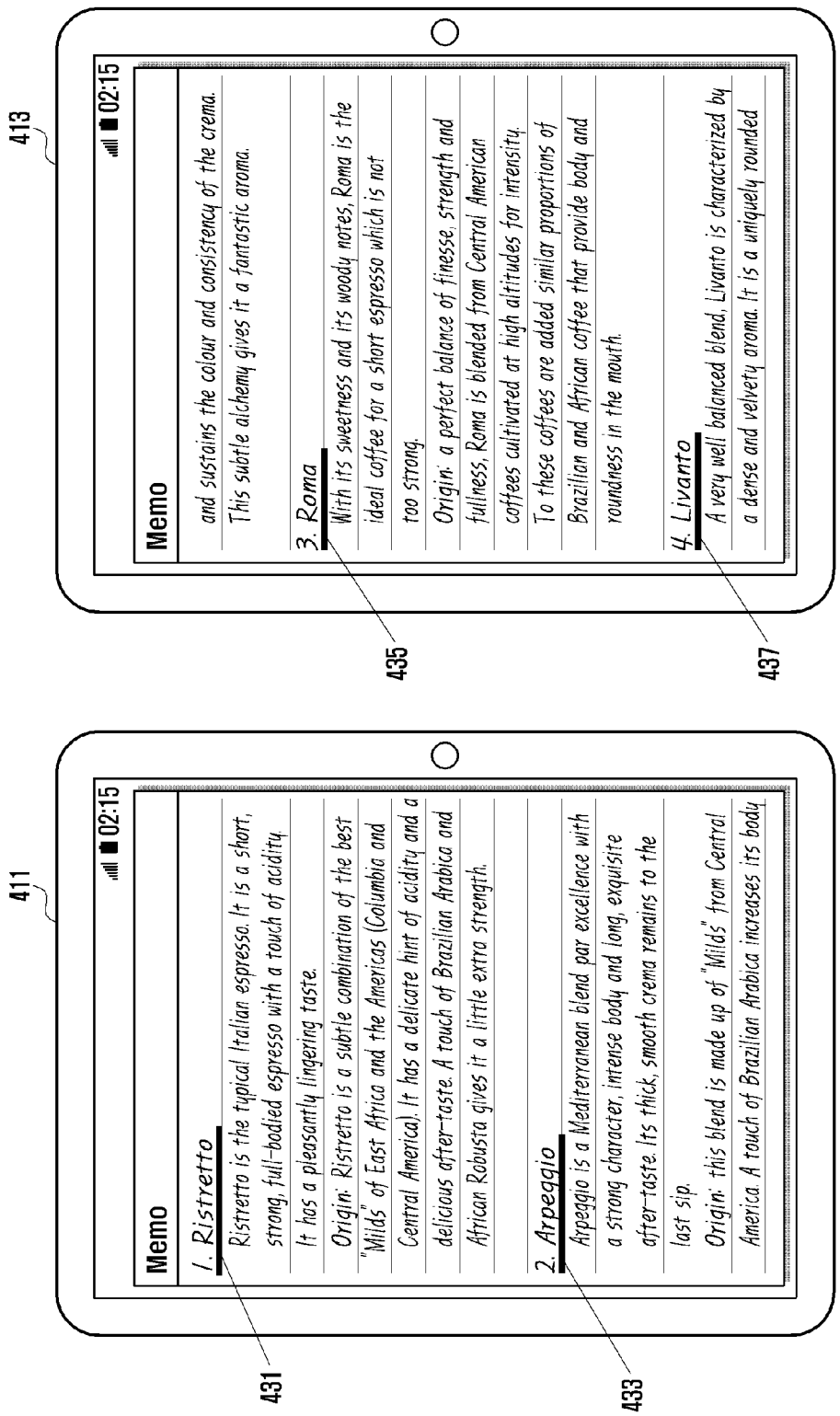

Referring to FIGS. 3, 4A, 4B, 4C, and 4D, a controller 100 may display an icon (hereinafter, referred to as a list generation icon) for editing a document in a state where the document is displayed as illustrated in FIGS. 4A and 4B. Accordingly, when the user selects the list generation icon, the controller 100 detects the selection of the list generation icon in operation 311, proceeds to operation 331 described below when the selection of the list generation icon is not detected in operation 311 and when the selection of the list generation icon is detected in operation 311 maintains the state where the document is displayed as illustrated in FIGS. 4A and 4B at operation 313. When the user selects a particular area of the document in the state where the document is displayed, the controller 100 detects the selection of the particular area at operation 315, extracts information of the selected area at operation 317, and generates the extracted information as a document list and stores the generated document list together with link information of the generated list in operation 319. When the document list is generated, two or more lists may be generated with respect to one document, and the controller 100 may generate a document list including a plurality of lists in one document. In contrast, when no area is selected in operation 315, the controller performs operation 321, which is discussed in more detail below.

Figure 4C:
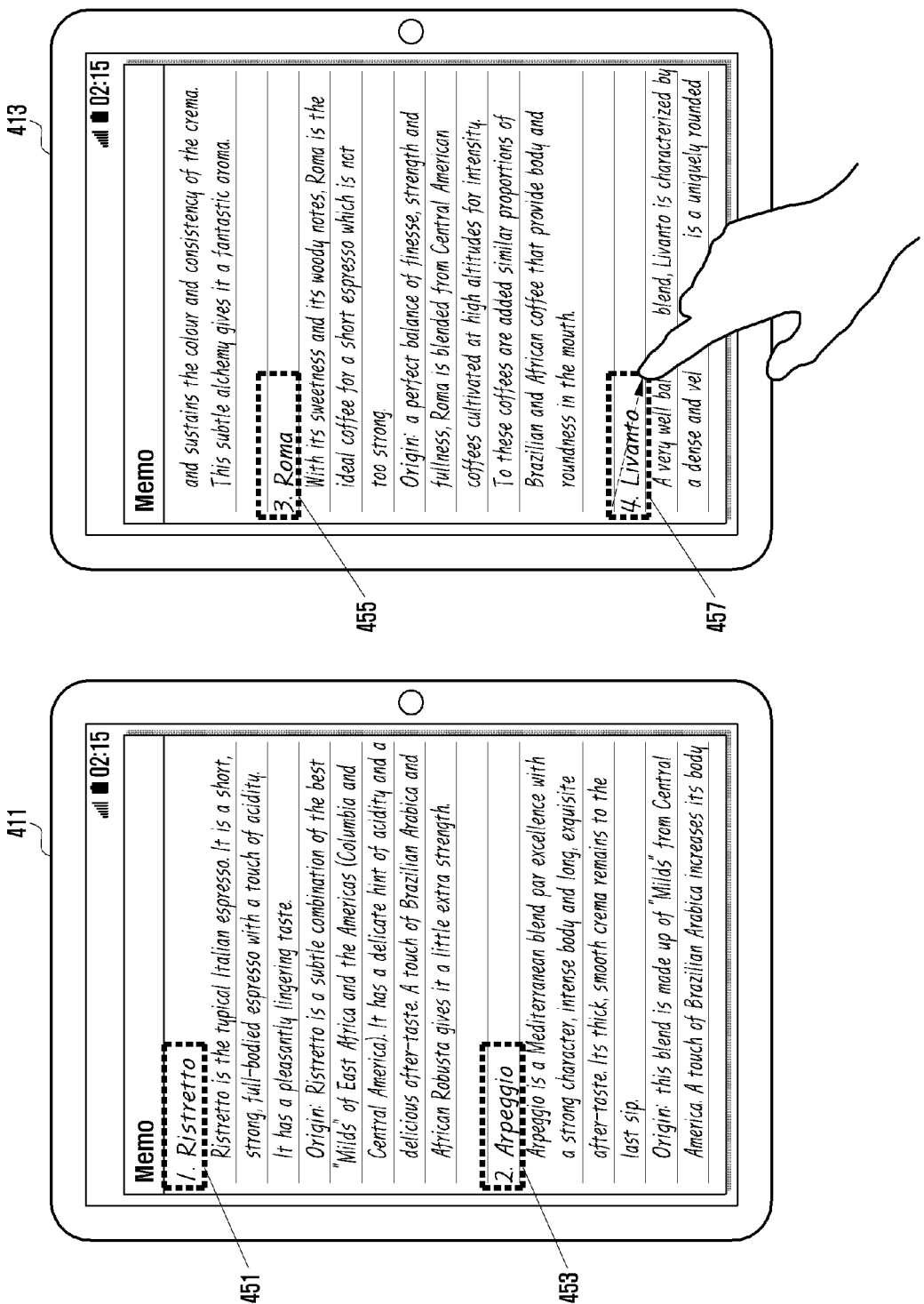
Figure 4D:
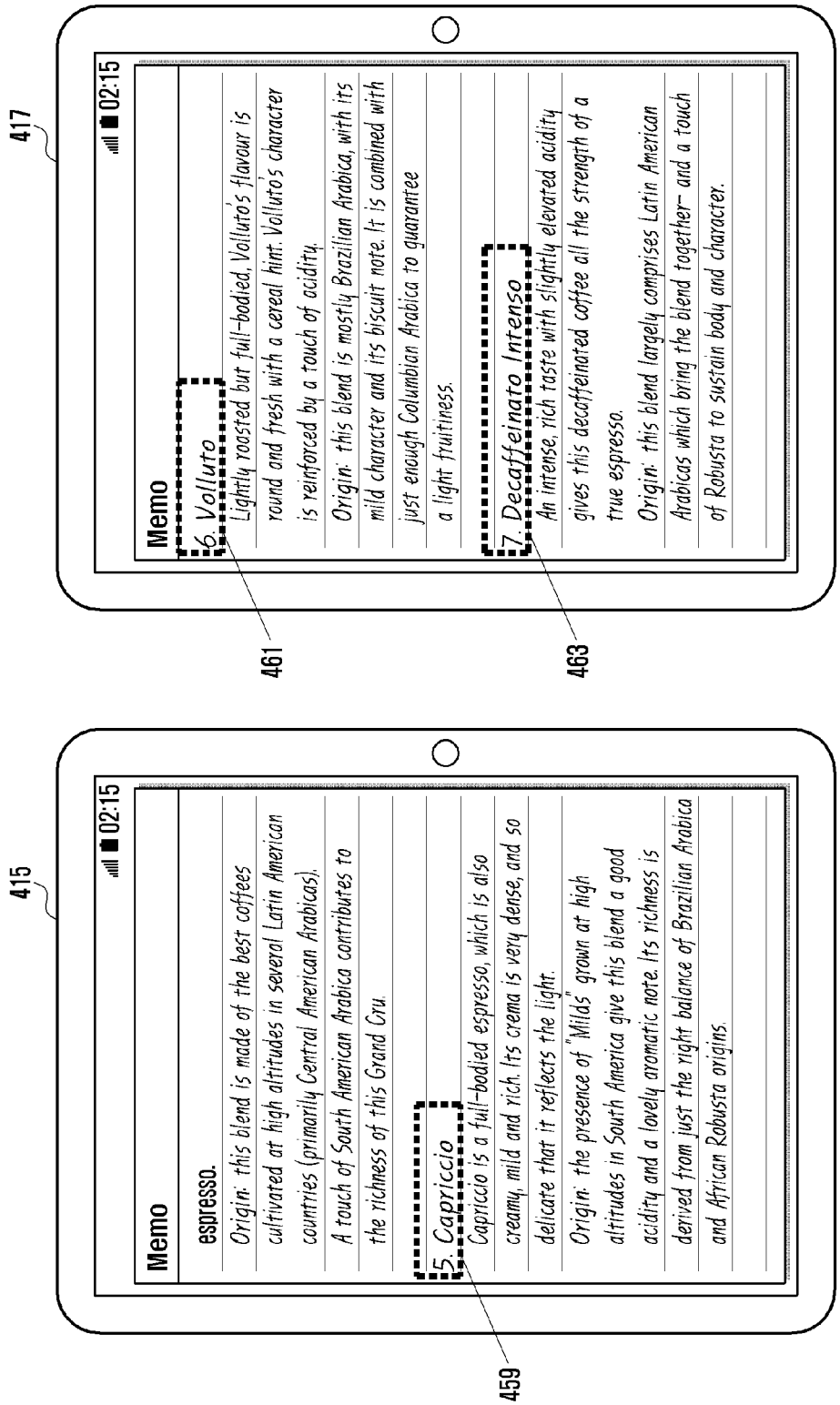

At this time, a method of extracting the area in the document may be implemented in various ways. FIGS. 4A, 4B, 4C, and 4D illustrate examples of a displayed document. The displayed document as illustrated in FIGS. 4A to 4D is an example of a document including four or more pages 411, 413, 415 and 417. Further, FIGS. 4A and 4B illustrate an example of selecting an area by using a pen as indicated by reference numerals 431, 433, 435, 437, 439, 441 and 443 and FIGS. 4C and 4D illustrate an example of selecting an area by using a finger as indicated by reference numerals 451, 453, 455, 457, 459, 461 and 463.

The user may first select content which the user desires to make into a list, by using a pen or a finger. Then, the controller 100 may detect the selection of the content through the input unit 140 and display corresponding areas underlined by the pen or dragged by the finger on the display unit 130 as indicated by reference numerals 431, 433, 435, 437, 439, 441 and 443 or 451, 453, 455, 457, 459, 461 and 463 in FIGS. 4A to 4D. The controller 100 extracts contents of the selected areas 431 to 443 (or 451 to 463). At this time, when information of the areas 431 to 443 (or 451 to 463) is an image (for example, writing input), the controller 100 may recognize the image of the selected areas 431 to 443 and convert the image to text data in operation 317. That is, when the contents of the selected areas are an image, the controller 100 may further perform a text recognition process in operation 317 and may generate the converted text as a list in operation 319. For example, when the user selects seven areas 431 to 443 of FIGS. 4A and 4B (or 451 to 463 of FIGS. 4C and 4D), the controller 100 generates information of the areas 431 to 443 (or 451 to 463) as lists and stores the generated lists together with position information (that is, link information) of documents corresponding to the respective generated lists.

When the information of the particular areas within the document are generated as lists and the generation of the lists ends in operations 315 to 319, the controller 100 detects the end of the list generation in operation 321 and stores the generated lists as document lists in operation 323. In this case, the stored document lists may include lists selected by the user (431 to 433 of FIGS. 4A and 4B and 451 to 463 of FIGS. 4C and 4D). At this time, the controller 100 may store the document lists in a particular area of the storage unit 110. The document lists may be generated as thumbnail images and stored in the form of icons. Further, the controller 100 may configure an area to store the document lists as a folder area or configure the area by default (for example, a document list area, or an S-memo area in the case of an image type document made by a pen). Hereinafter, the area storing the document lists may be referred to as a document list area, and the document list area may be displayed in the form of icon on a home screen or an application screen. In contrast, when the controller 100 does not detect the end of the list generation in operation 321, the controller returns to operation 315.

When the user selects displaying of the document lists in the state where the document lists are stored as described above, the controller 100 proceeds from operation 311 and detects whether a selection of displaying a list has been made in operation 331, displays the stored document lists in operation 333 when the selection of displaying the list has been made in operation 331, and displays a document list selected from the displayed document lists on the display unit 130. When the controller 100 detects that the selection of displaying the list has not been made in operation 331, the controller then performs a corresponding function. At this time, the displayed document lists may be lists selected in the operation of generating the document lists. When the user selects a particular list from the displayed document lists, the controller 100 detects the selection of the particular list in operation 335, identifies link information of a document corresponding to the selected list, and displays the document corresponding to the list. When the user does not select a particular list in operation 335, the controller proceeds to operation 339, as described below.

At this time, the user may display documents while changing selections of a plurality of lists included in the document lists. In this case, the user touches a button (for example, a cancel button) of selecting a previous screen through the input unit 140 in the state where the document of the selected list is displayed. Accordingly, when the button of selecting the previous screen is selected, the controller 100 may detect the selection of the button, and display again the lists included in the document lists in operation 333. When a list is selected from the displayed document lists, the controller 100 may identify link information of the corresponding list and then display content of a document at the corresponding position at operation 337. Further, the controller 100 may display the document while moving the document through a scroll in the state where the document is displayed.

When a request for ending the displaying of the document is made in the state where the document is displayed as described above, the controller 100 detects the request and ends the operation of displaying the document in operation 339. When the controller 100 determines that it is not the end of the operation of displaying the document in operation 339, the controller again performs operation 333.

Figure 5:
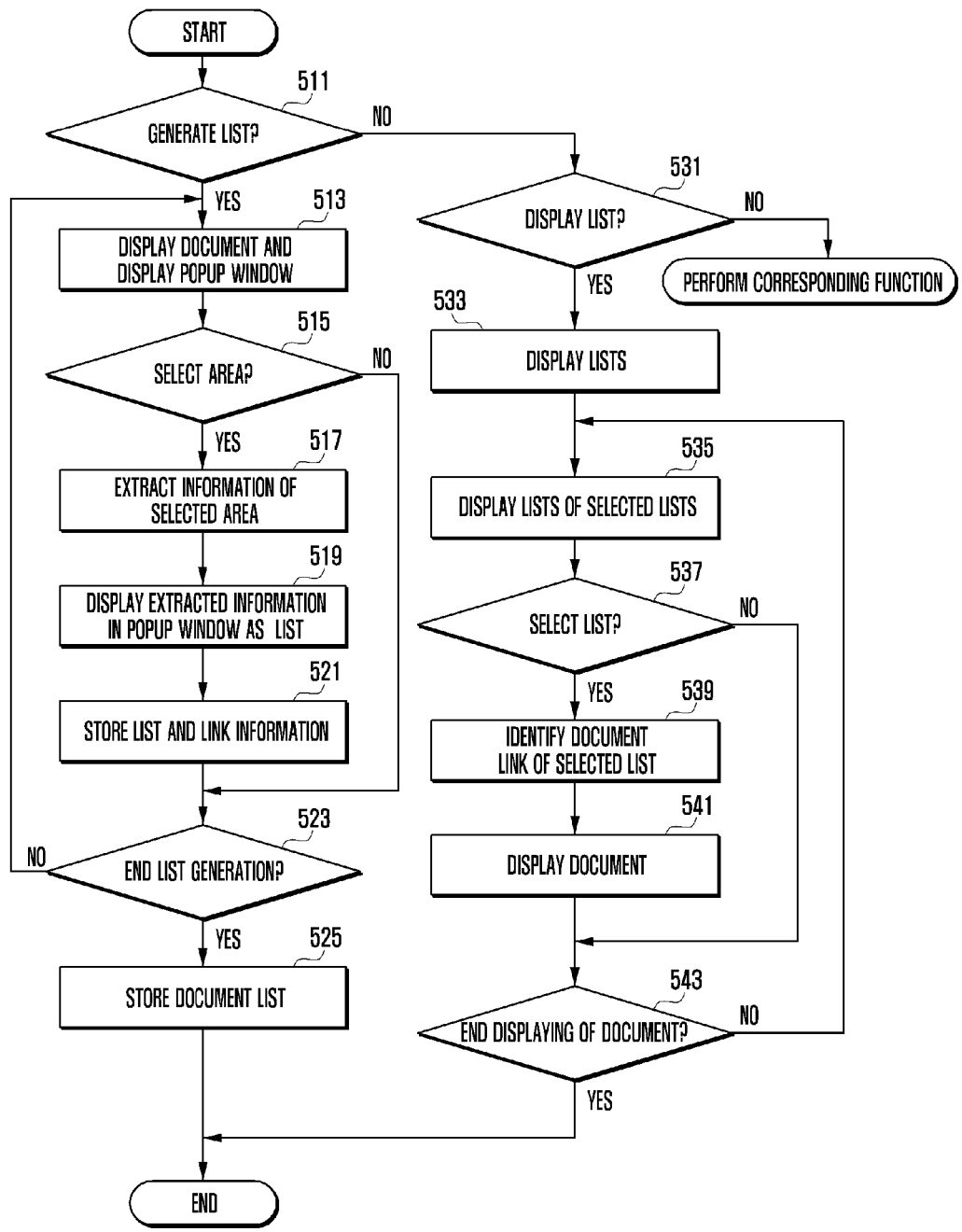
FIG. 5 is a flowchart illustrating a process of generating document lists and displaying a document from the generated document lists in an electronic device according to an embodiment of the present disclosure.
Figure 6A:
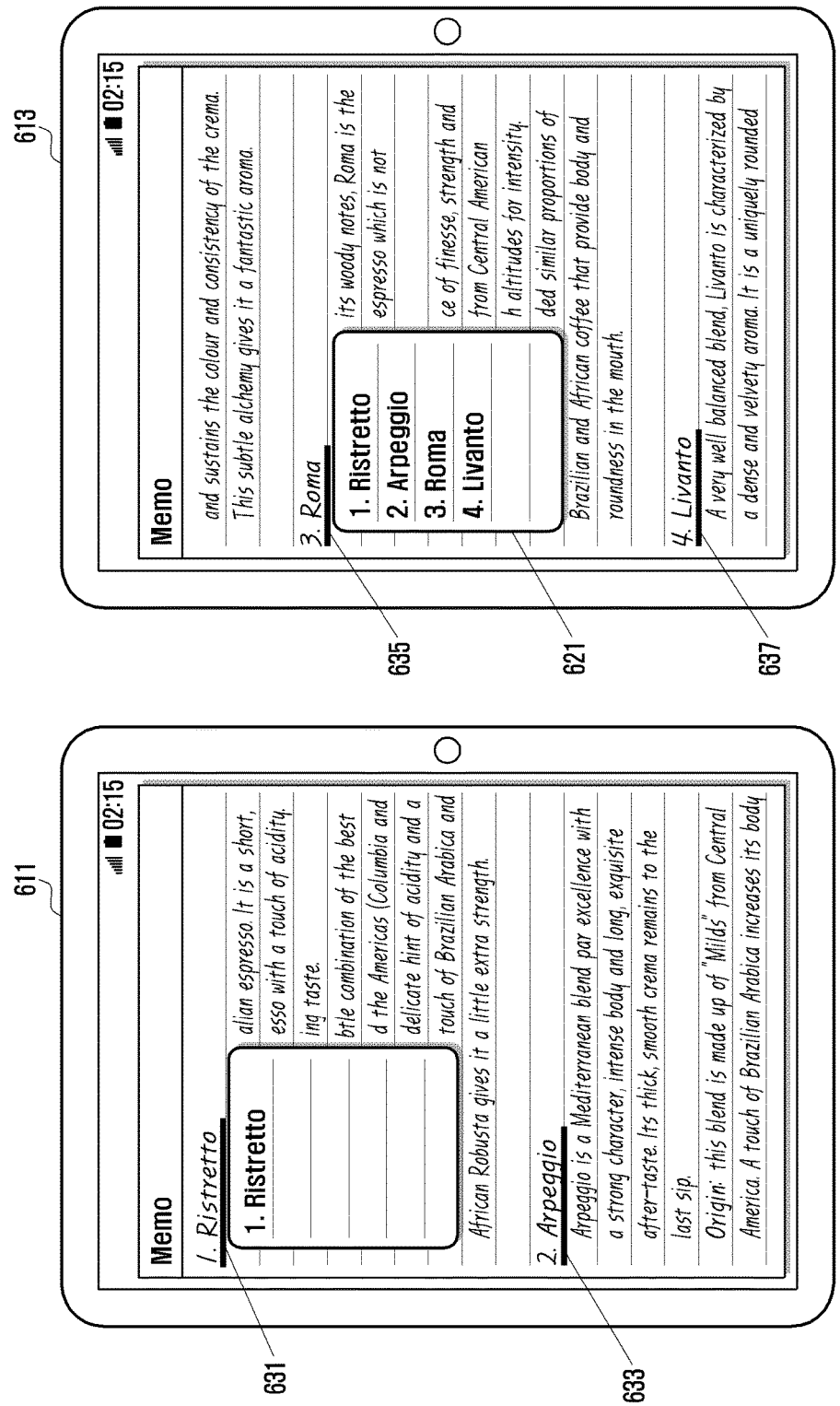
FIGS. 6A, 6B, and 6C are views describing a method of generating document lists according to various embodiments of the present disclosure.
Figure 6B:
Figure 6C:
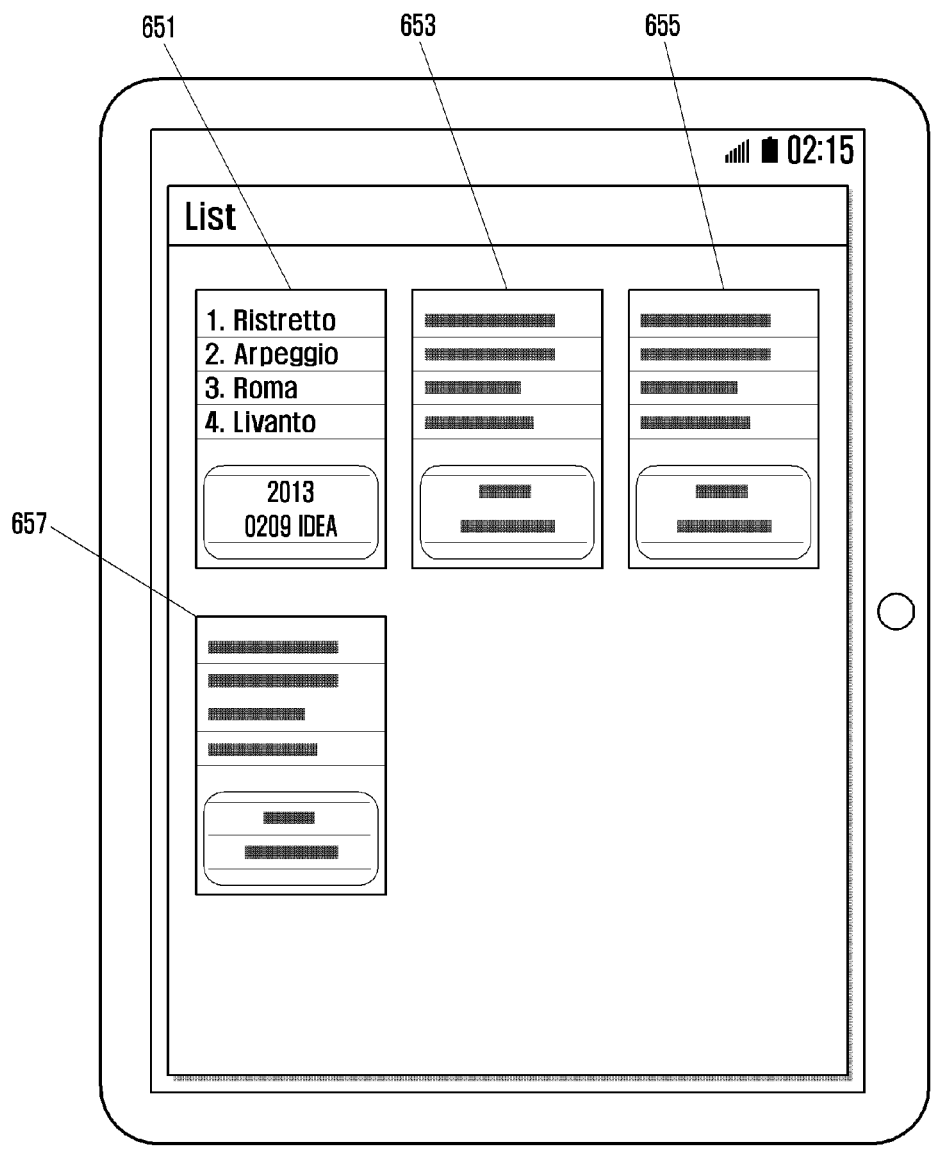
Figure 7A:
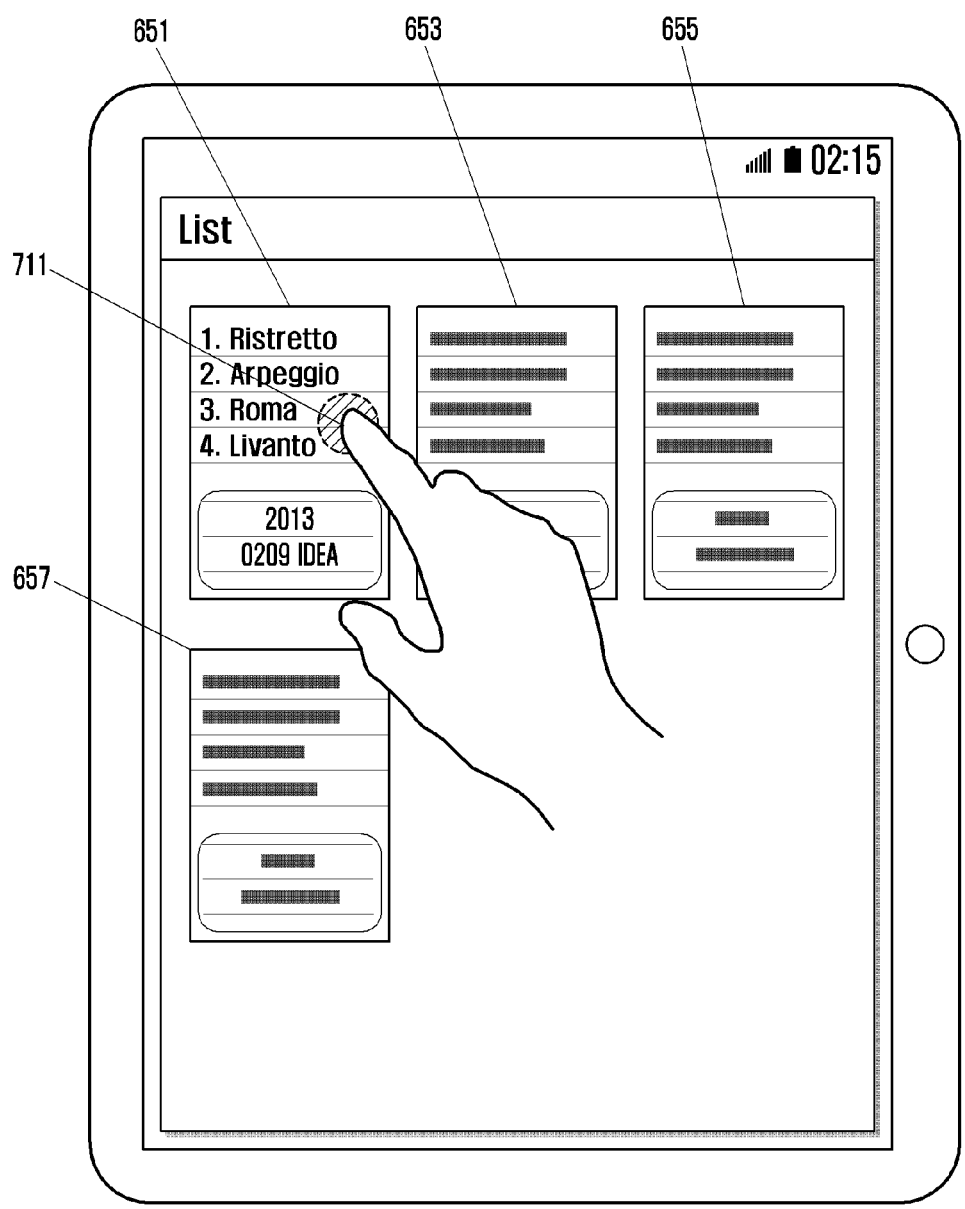
FIGS. 7A, 7B, and 7C are views describing a method of displaying a document included in document lists according to various embodiments of the present disclosure.
Figure 7B:
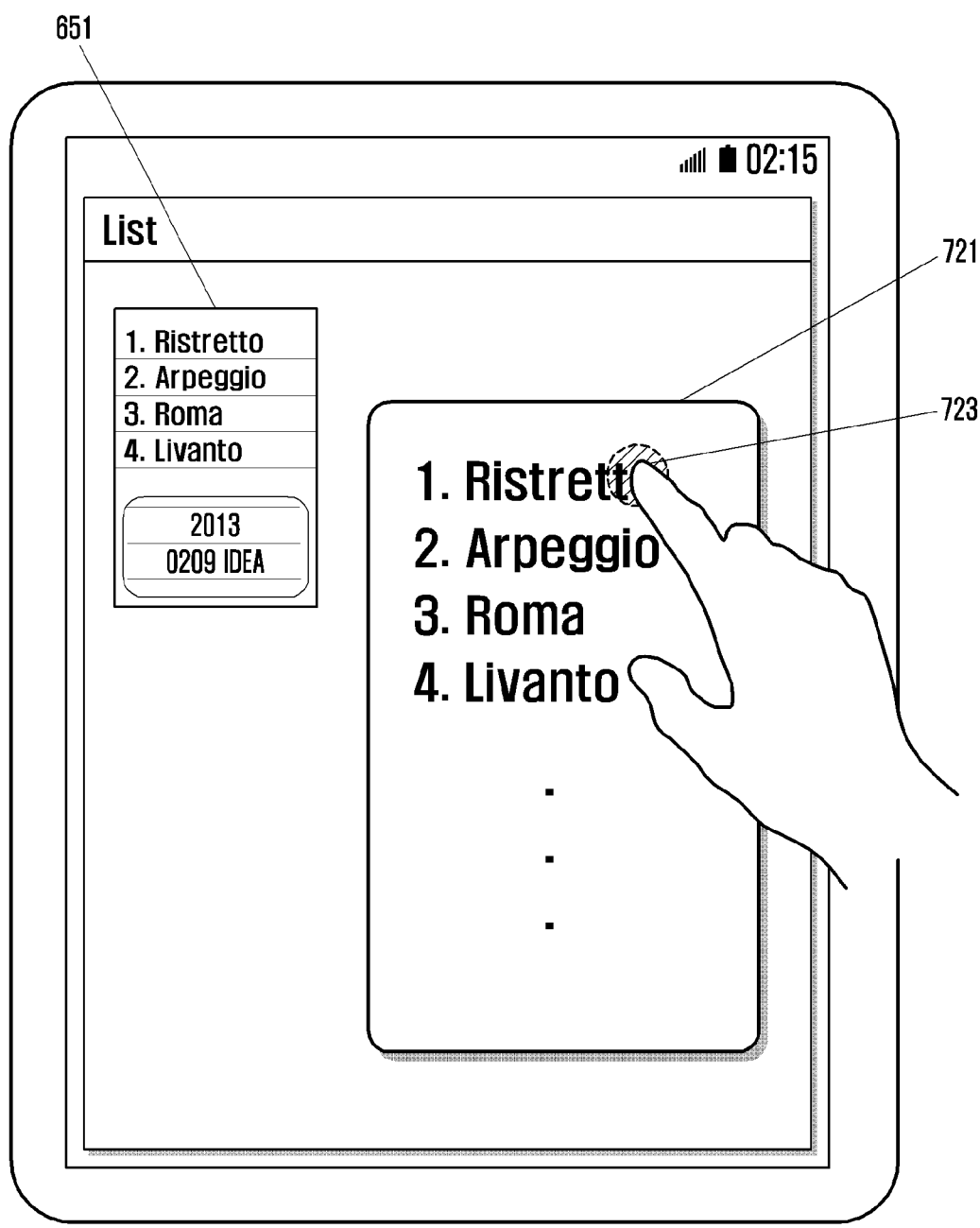
Figure 7C:
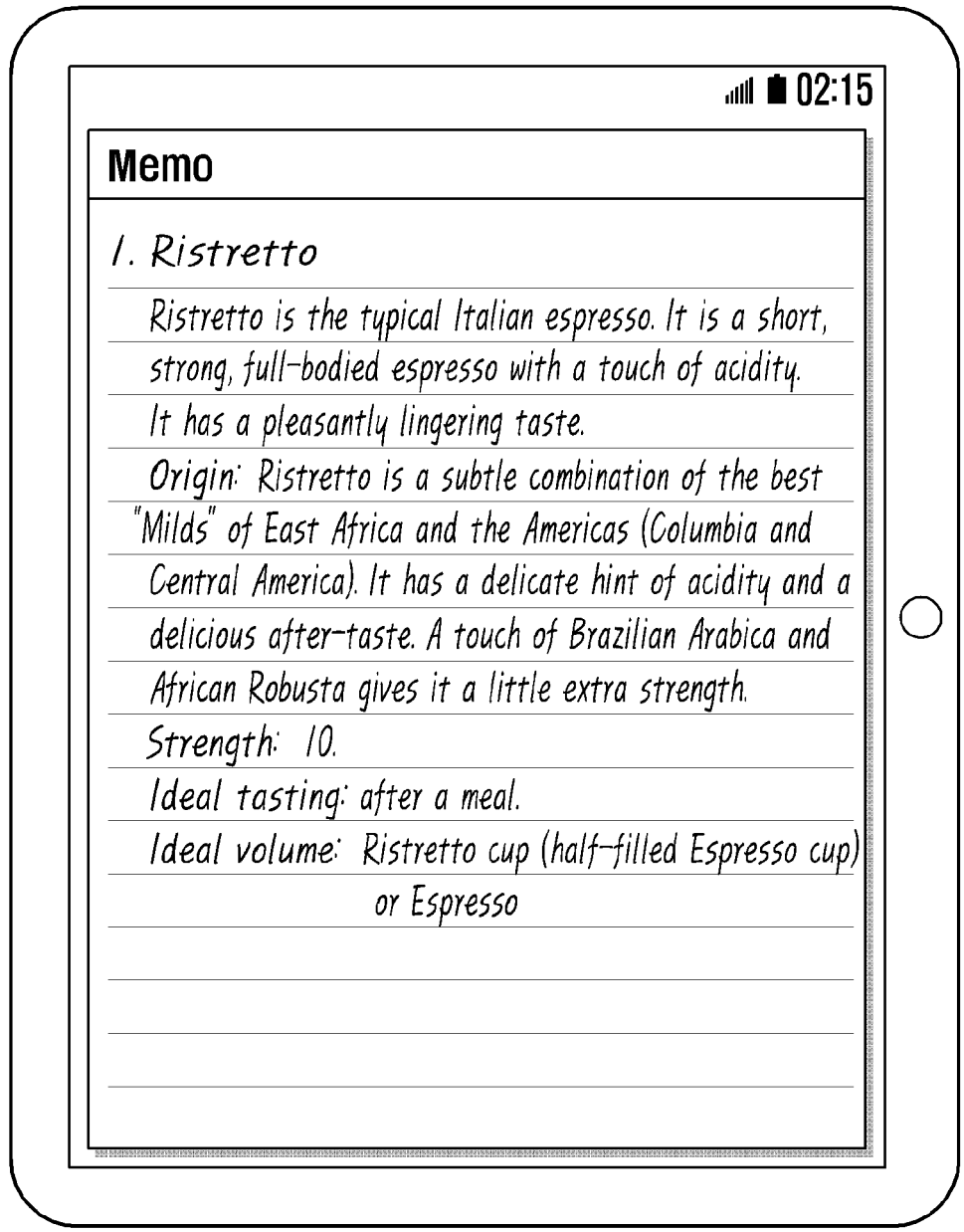

FIG. 5 is a flowchart illustrating a process of generating document lists and displaying a document of the generated lists in the electronic device according to an embodiment of the present disclosure. FIGS. 6A, 6B, and 6C are views describing a method of generating document lists according to various embodiments of the present disclosure. FIGS. 7A, 7B, and 7C are views describing a method of displaying a document of a list included in the document lists according to various embodiments of the present disclosure.

Referring to FIGS. 5, 6A, 6B, 6C, 7A, 7B, and 7C, a controller 100 may display an icon (list generation icon) for editing the document in a state where the document is displayed. When the user selects the list generation icon in the state where the document is displayed, the controller 100 detects the selection of the list generation icon in operation 511, displays a document as illustrated in FIG. 6A, and displays a popup window 621 in operation 513 when the selection of the list generation icon is detected. Note that when the selection of the list generation icon is not detected in operation 511, the controller performs operation 531 as described in detail below. The popup window 621 is a window for displaying document lists selected by the user. When the user selects a particular area of the document in the state where the document is displayed as indicated by a reference numeral 611 of FIG. 6A, the controller 100 detects the selection of the particular area in operation 515, such that when the selection of the particular area is not detected the controller proceeds to operation 523 discussed in detail below and when the selection of the particular area is detected in operation 515 the controller 100 extracts information of the selected area in operation 517, generates the extracted information as document lists and displays the document lists in the popup window 621 in operation 519, and stores the generated document lists together with link information of the generated lists in operation 521.

When generating the document lists, the user may select two or more lists in one document, and the controller 100 may insert one or more lists selected by the user into the document lists. Accordingly, when the user selects information of an area 631 in the screen 611 of FIG. 6A, the controller 100 stores content of the selected area as a list and displays the list in the popup window 621 in operations 517, 519 and 521. Thereafter, when the list generation does not end in operation 523 the controller 100 returns to operation 513 and displays the document in the screen 611 and the popup window 621. When the user selects an area 633, the controller 100 detects the selection of the area in operation 515 and stores information of the selected area again in operations 517, 519 and 521. Although not illustrated in FIG. 5, when the user desires to successively configure a list in the next page of the document, the user may display the next page of the document as indicated by a reference numeral 613 of FIG. 6A by scrolling the displayed document. That is, when a scroll input is generated in the state where the document is displayed, the controller 100 may detect the generation of the scroll input through the input unit 140 and display content of the next page of the document as indicated by the reference numeral 613 of FIG. 6A. When the user selects a particular area in the document of the changed page, the controller 100 detects the selection of the particular area in operation 515, and registers information of the selected area as a list and displays the list in the popup window 621 in operations 517, 519 and 521.

A method of selecting the area for configuring the list may be performed using a pen or a finger and the selected area may be detected by a touch input or a hovering input. That is, the area of the list may be selected using the pen or the finger and the selected area may be detected by the touch input or the hovering input. FIG. 6A illustrates an example of selecting an area by a finger touch.

The display document may be a document including text data or an image data made by writing. At this time, the document is the text data, the controller 100 stores text data and link information of the selected area as a list and displays the text data of the selected area in the popup window 621. When information of the selected area is image text, the controller 100 may extract image text of the selected area, recognize the image, and convert the recognized image to text data. Further, the controller 100 may store link information of the document where the image text is located and the changed text data as a list and may display the changed text data in the popup window 621.

When the information of the particular areas within the document are generated as lists and then the generation of the lists ends in operations 513 to 521, the controller 100 detects the end of the list generation in operation 523 and stores the generated lists as document lists in operation 525. At this time, the controller 100 may store the document lists in the document list area corresponding to the configured area of the storage unit 110. Further, when the document is an image document using a pen and document lists are generated using the pen, the controller 100 may store the document lists in an S-memo area. In addition, the controller 100 may convert the document lists having a structure illustrated in FIG. 6B to an image icon type in a thumbnail form and store the image icon in the document list area of the storage unit 110 as illustrated in FIG. 6C. In this case, the document list area of the storage unit 110 may store a plurality of document lists as indicated by reference numerals 651, 653, 655 and 657 of FIG. 6C.

By performing operations 511 to 525, the controller 100 may generate the displayed document lists and store the generated document lists in the storage unit 110, and the document lists have a structure in which contents selected by the user from the document are generated as lists. When the user selects the document list area in the state where the document lists are stored as described above, the controller 100 detects the selection of the document list area in operation 531 and displays selected document lists (lists 651 to 657 of FIGS. 6C and 7A) on the display unit 130 in operation 533. When the controller 100 detects in operation 531 that the selected documents lists are not displayed, then the controller 100 performs a corresponding function. At this time, when the user selects a particular document list 711 from the displayed document lists as illustrated in FIG. 7A, the controller 100 enlarges and displays the selected document list on the popup window as indicated by a reference numeral 721 of FIG. 7B in operation 535. The document lists displayed as indicated by the reference numeral 721 may be displayed with a size in which each of the lists can be selected. When the user selects a particular list from the lists as indicated by a reference numeral 723 of FIG. 7B in a state where the document lists are displayed as indicated by the reference numeral 721 of FIG. 7B, the controller 100 detects the selection of the particular list in operation 537, when no selection is detected in operation 537 the controller 100 proceeds to operation 543 discussed in detail below and when a selection is detected in operation 537 the controller 100 identifies link information of the document corresponding to the selected list in operation 539, and then displays content at a position of the document corresponding to the list as illustrated in FIG. 7C in operation 541.

As described above, when the user selects a desired list from the displayed lists in a state where document lists of the storage unit 110 are selected and displayed, the controller 100 displays the content of the document at a position corresponding to link information of the selected list among the entire document. Further, the controller 100 may display content of the document at a position of a list different form the currently displayed list of the document lists according to a user's input. For example, when a button (for example, a cancel button) for selecting a previous screen through the input unit 140 is generated/selected, the controller 100 detects the generation/selection of the button in operation 543 and returns to operation 535 to display again the lists included in the document lists. When a particular list is selected in the state where the document lists are displayed in operation 535, the controller 100 may detect the selection of the particular lists in operation 537 and display content of the document at a position where text of the corresponding list is located in operations 539 and 541. That is, when a different list is selected from the document lists while the document is displayed, the controller 100 may move to a position of the content of the linked document by the selected list and display the document. When the controller 100 detects the end of displaying the document in operation 543 the controller ends the process illustrated in FIG. 5.

Although not illustrated in the drawings, when the user generates a scroll input in a state where the document at a position of the selected list is displayed as illustrated in FIG. 7C, the controller 100 may change and display content of the document while moving the document in a scroll input direction. Further, although not illustrated in the drawings, when a previous screen selection button (for example, a cancel button) is generated in an operation of displaying the document lists in operation 535, the controller 100 may detect the generation of the previous screen selection button and display all document lists stored in the document list area as illustrated in FIG. 7A.

When a request for ending the displaying of the document is made in the state where the document is displayed as described above, the controller 100 detects the request and ends an operation of displaying the document in operation 543.

As illustrated in FIGS. 5, 6A, 6B, 6C, 7A, 7B, and 7C, the electronic device may extract contents of areas of the document selected by the user, generate the contents as lists, and directly display content of the document at a position of the list selected from the generated lists when displaying the document. At this time, as illustrated in FIGS. 6A and 6B, when the user underlines content by using a pen or drags content by using a finger to make the content as a list, the controller 100 may display the popup window 621 on a part of the screen near the selected area and shows in advance the content which the user desires to make as the list, so that the user can identify a progress state. When the user selects areas which the user desires to make as lists as illustrated in FIG. 6A, the controller 100 edits the areas to generate document lists as illustrated in FIG. 6B. At this time, a method of making lists may correspond to a method of detecting areas selected by the user, capturing at least some of the screen like screen capturing, and combining the screens. Further, the method may correspond to a method of making lists by recognizing text of the areas selected by the user, gathering the text of the corresponding parts into one writing form, and storing the gathered text as an image. The document lists made as illustrated in FIG. 6B may be stored in the storage unit 110 as illustrated in FIG. 6C. At this time, the document lists generated by extracting the selected parts may be stored in a thumbnail form.

When the user selects the stored document list to display the document, the list may be selected and then directly moved to a desired position of the document and displayed. At this time, the document lists may be displayed in a thumbnail form as illustrated in FIG. 7A and also may be displayed such that the thumbnail form is overlaid or combined with a title. When the user performs a direct touch or a proximity touch on the list displayed as thumbnail as illustrated in FIG. 7A, the controller 100 may enlarge lists included in the selected document lists as illustrated in FIG. 7B. At this time, a title may be omitted as illustrated in FIG. 7B and only lists of the corresponding document lists may be displayed. Thereafter, when the user selects a particular list from the displayed lists as illustrated in FIG. 7B, the controller 100 may immediately display content of the document corresponding to a position of a link of the selected list as illustrated in FIG. 7C.

Further, in generating the document lists, the controller 100 may generate lists in two or more documents and generate the lists as one document list. For example, a document may be referred from other one or more documents connected to the corresponding document. In this case, generating a plurality of documents as one document list may be effective.

Figure 8:
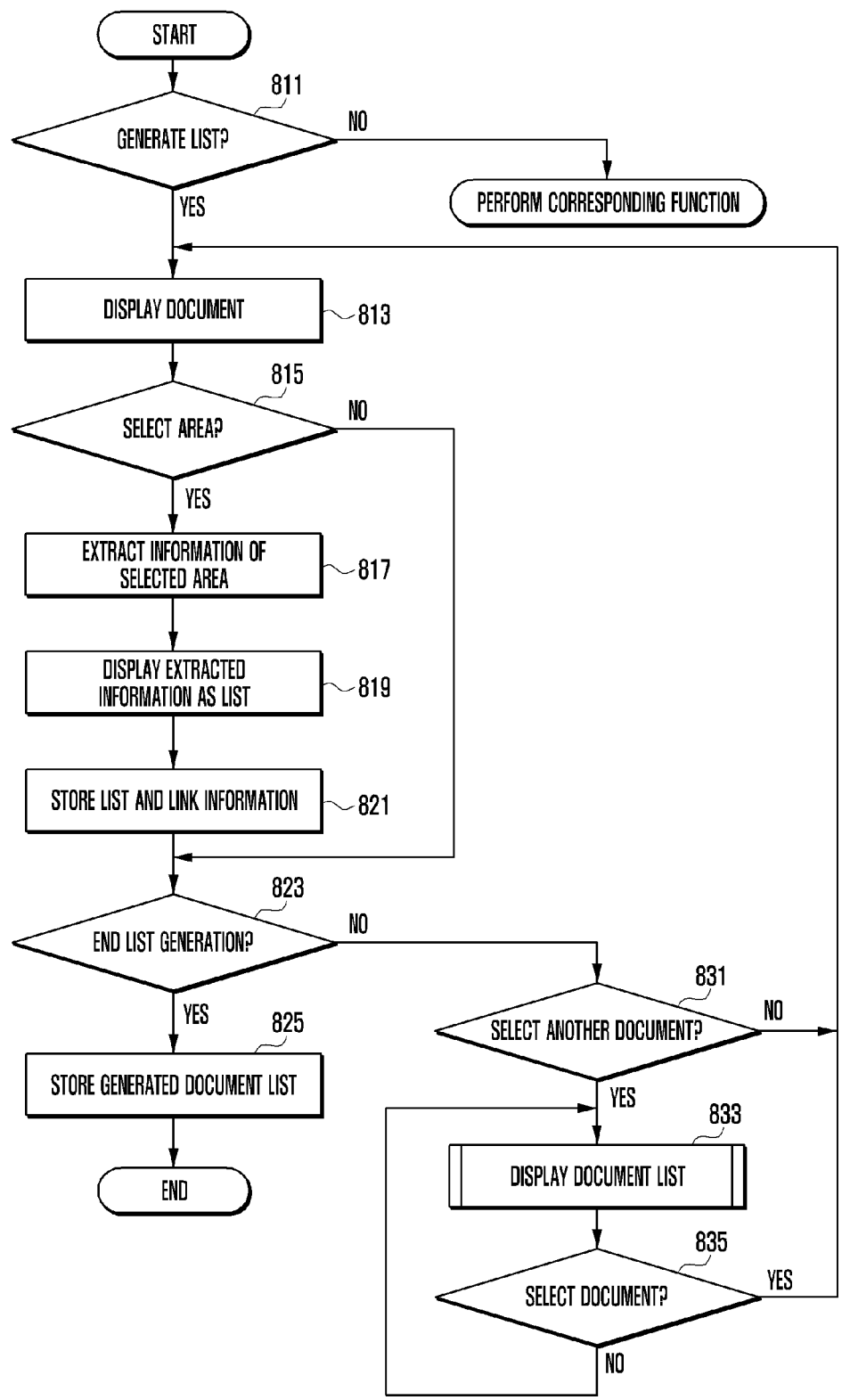
FIG. 8 is a flowchart illustrating a method of generating desired contents contained in a plurality of documents as one document list in an electronic device according to an embodiment of the present disclosure.

FIG. 8 is a flowchart illustrating a method of generating desired contents in a plurality of documents as one document list in an electronic device according to an embodiment of the present disclosure.

Referring to FIG. 8, a flowchart is illustrated, in which, when a list generation icon is selected in a state where a document is displayed, a controller 100 detects the selection of the list generation icon in operation 811, such that when the selection of the list generation icon is not detect in operation 811 the controller 100 performs a corresponding function, and when the selection of the list generation icon is detected in operation 811 the controller 100 displays a document in operation 813. At this time, the controller 100 may display a popup window like the popup window 621 of FIG. 6A. When the user selects a particular area of the document in the state where the document is displayed, the controller 100 detects the selection of the particular area in operation 815, such that when the selection of the particular area is not detected by the controller 100 in operation 815 the controller 100 proceeds to operation 823 described in detail below, and when the selection of the particular area is detected by the controller 100 in operation 815 the controller 100 extracts information of the selected area in operation 817, generates the extracted information as a document list and displays the document list in the popup window 621 in operation 819, and stores the generated document list together with link information of the generated list in operation 821. By repeatedly performing operations 813 to 821, the controller 100 may generate lists selected by the user from the displayed document as a document list.

In operation 823 the controller 100 detects an end of the list generation. At this time, when the user selects a document other than a currently displayed document (e.g., the controller 100 detects that it is not the end of the list generation in operation 823), the controller 100 detects the selection of the document in operation 831, proceeds to operation 813 when another document is not selected in operation 831, and when another document is selected in operation 831 displays lists of other documents which can be selected in operation 833. Further, when a particular document is selected from the displayed document list, the controller 100 detects the selection of the particular document in operation 835 and returns to operation 813 to display the selected document on the display unit 130 when another document is selected, but returns to operation 833 when another document is not selected. To this end, the controller 100 may display a document change icon which can select another document when displaying the document in operation 813. When the user selects the document change icon in the state where the document is displayed in operation 813, the controller 100 may detect the selection of the document change icon in operation 831 and displays a home screen or an application screen in operation 833 to allow the document selection. At this time, when the user selects an icon or a folder including the document in the screen, the controller 100 may recognize the selection of the icon or the folder in operation 833 and displays a document list connected to the corresponding icon or lists of documents included in the corresponding folder on the display unit 130. Further, when the user selects a desired document in the state where the document lists are displayed, the controller 100 may detect the selection of the desired document in operation 835 and display the selected document on the display unit 330 in operation 813.

By repeatedly performing operations 813 to 821, the controller 100 may generate a list in a document different from a document displayed in a previous state, and generate lists selected from a plurality of documents and insert the lists into one document list. When a request for ending list generation is made, the controller 100 may detect the request in operation 823 and store a document list including lists generated in a plurality of documents in a document list area of the storage unit 110 in operation 825.

When the document list including the lists generated in the plurality of documents is selected, the controller 100 may identify link information corresponding to the selected list and display a document corresponding to a link position of the corresponding document.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and the scope of the present disclosure as defined by the appended claims and their equivalents.

What is claimed is:

1. A method of processing a document by an electronic device, the method comprising:
   displaying, by a display, a document;
   displaying, within an execution screen of the document, a list generation icon;
   detecting an input selecting the list generation icon;
   detecting, in response to the selection of the list generation icon, a touch input for selecting areas of the document currently displayed on the display;
   extracting information from the selected areas;
   generating at least two lists from the extracted information;
   displaying the generated at least two lists on a popup window; and
   in response to an input for terminating list generation, storing the displayed at least two lists within a single document list together with link information of the document where the at least two lists originated,
   wherein the at least two lists includes the generated list and at least one other list generated from an information extracted from other selected area of the document, and
   wherein the extracting of the information from the selected areas comprises capturing an image to convert information into the at least two lists.

2. The method of claim 1, further comprising displaying a document of a list selected from the single document list, wherein the displaying of the document of the list selected from the single document list further comprises:
   when the stored single document list is selected, displaying the at least two lists included in the single document list;
   identifying link information of a list selected from the displayed at least two lists; and
   displaying a document of the selected list in a position of the identified link information.

3. The method of claim 2, wherein the storing of the at least two lists further comprises:
   repeatedly converting information from selected areas to lists whenever a selected area is detected; and
   storing the lists together with link information of documents in positions of the selected areas.

4. The method of claim 3, wherein the storing of the at least two lists further comprises displaying the stored at least two lists in a popup window.

5. The method of claim 3, wherein the storing of the at least two lists further comprises:
   selecting another document that is different from a currently displayed document and displaying the selected other document;
   repeatedly converting information from selected areas detected from the selected other document to lists; and
   storing the lists converted from the selected other document together with link information of documents in positions of the selected areas.

6. The method of claim 3, wherein the storing of the stored at least two lists as the single document list further comprises converting the single document list to an icon image in a thumbnail form and storing the icon image in the thumbnail form.

7. The method of claim 6, wherein the icon image in the thumbnail form displays the at least two lists included in the single document list.

8. The method of claim 1, wherein the detecting of the touch input further comprises detecting an area where a direct or proximity touch input by a pen or a finger is detected as a selected area.

9. The method of claim 8, wherein the touch input is an input of an underline, a drag, or a check.

10. The method of claim 2, wherein the displaying of the document of the list selected from the one document further comprises, when the single document list is selected, displaying a popup window and displaying at least two lists included in the selected document list in the popup window.

11. The method of claim 10, wherein the displaying of the document of the list selected from the one document further comprises, when a list displayed in the popup window is selected, displaying content at a position of a document corresponding to link information of the selected list.

12. An apparatus for processing a document in an electronic device, the apparatus comprising:
   a display configured to display a document;
   a touch input panel configured to receive a touch input;
   a memory configured to store a document list and link information; and
   a processor configured to:
      control to display, within an execution screen of the document, a list generation icon,
      detect an input selecting the list generation icon through the touch panel,
      detect, in response to the selection of the list generation icon, a touch input for selecting an area of the document currently displayed on the display through the touch input panel,
      extract information from the selected area,
      generate at least two lists from the extracted information,
      control to display the generated at least two lists on a popup window, and
      in response to an input for terminating list generation, store the displayed at least two lists within a single document list together with link information of the document where the at least two lists originated,
   wherein the at least two lists includes the generated list and at least one other list generated from an information extracted from other selected area of the document, and
   wherein the extracting of the information from the selected areas comprises capturing an image to convert information into the at least two lists.

13. The apparatus of claim 12, wherein, when the stored single document list is selected, the processor is further configured to:
   display at least two lists included in the single document list,
   identify link information of a list selected from the displayed at least two lists, and
   display a document of the selected list in a position of the identified link information.

14. The apparatus of claim 13, wherein, when the area selection signal is detected, the processor is further configured to:
   repeatedly display a popup window on the display,
   convert information from a selected area to a list, display the converted list in the popup window whenever the area selection signal is detected, and store the list in the memory together with link information of a document where the selected area is located.

15. The apparatus of claim 12, wherein the processor is further configured to detect a direct touch input or a proximity touch input by a pen or a finger through the touch input panel as the area selection signal.

16. The apparatus of claim 15, wherein the processor is further configured to:

recognize an image or text data of a corresponding area, and generate the image or the text data as a list when the area selection signal is detected.

17. The apparatus of claim 14, wherein the processor is further configured to convert the single document list to an icon image in a thumbnail form, and wherein the icon image includes the at least two lists included in the single document list.

18. The apparatus of claim 13, wherein, when the single document list is selected, the processor is further configured to display a popup window and display the at least two lists included in the selected document list in the popup window.

19. The apparatus of claim 18, wherein, when one of the lists displayed in the popup window is selected, the processor is further configured to display content in a position of a document corresponding to link information of the selected list on the display.

\* \* \* \* \*